Nov. 9, 1948.  H. KATZ  2,453,230
TOW BAR CLAMP
Filed March 26, 1947
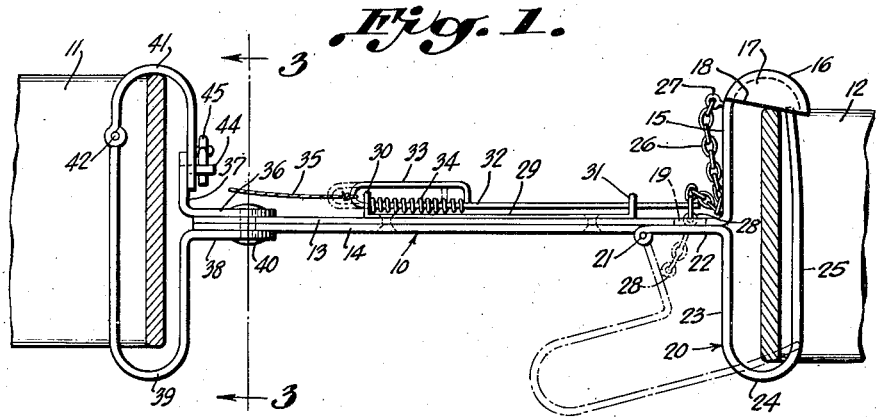
Fig. 1.
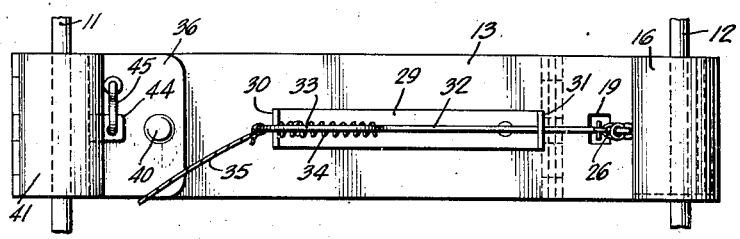
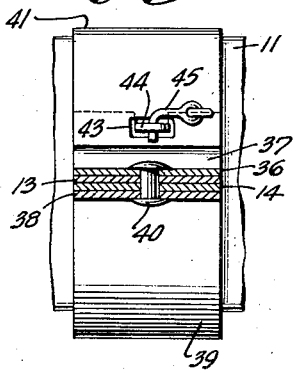
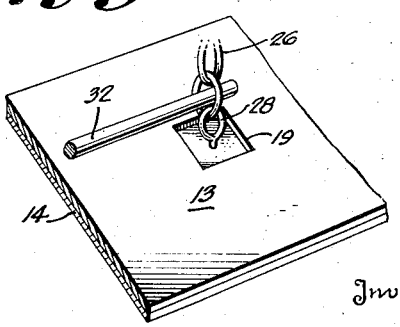
Inventor
H. KATZ
By Bur Cohen
Attorney Patented Nov. 9, 1948

2,453,230

UNITED STATES PATENT OFFICE 2,453,230

TOW BAR CLAMP

Heyman Katz, Asbury Park, N. J.

Application March 26, 1947, Serial No. 737,292

5 Claims. (Cl. 280—33.14)

1

The present invention relates to improvements in towing devices, more particularly a tow line clamp used in towing a car and which can be released at a point removed from the clamp.

The conventional manner of towing a car that is stalled or out of order is by means of a tow line, usually in the form of a heavy rope or chain. This gives rise to many difficulties, chief of which are: the liability of the rope or chain to break or part, difficulty in properly securing the rope or chain to the bumpers of the car being towed and the towing car, jerkiness due to the slack in the rope or chain, and many other disadvantages well known to drivers who have had occasion to be towed.

The present invention contemplates a towing device in the form of a rigid clamp member adapted to be secured to the rear bumper of the towing car and to the front bumper of the car being towed, resulting in a more positive and rigid connection between the two cars.

A further disadvantage of the conventional towing line exists while towing a car which has stalled and needs to be towed a short distance while the car is in gear to enable the car to start up. After the car has started up, it is necessary to stop both cars to remove or disengage the tow line.

In the present invention, release of the towed car is accomplished from within the towing car while the same is in motion, and since the towing device is in the form of a rigid clamp member, it will remain on the towing car without touching the ground and will not interfere with the running of the car.

It is recognized that rigid clamping members have been used in the past between a towing car and a car being towed wherein the main function of the clamp is to eliminate the presence of a driver in the towed car. This device is most commonly used by parking garages for picking up cars to be parked. Although the clamp of the present invention can be used in a similar manner, the primary purpose of the clamp is to replace the usual tow lines and overcome the disadvantages thereof as pointed out above.

A further important object of the present invention is to provide a tow clamp which is relatively simple in construction, inexpensive to manufacture, easy to operate, and which is of strong rugged construction.

Further objects and advantages of the present invention will be readily apparent from the following detailed description taken in connection with the accompanying drawing showing a preferred embodiment of the invention and in which:

Figure 1 is a vertical side elevation of the clamp, shown mounted on the bumpers of two cars, only a section of the bumpers being shown.

Figure 2 is a top plan view of the clamp seen in Figure 1.

Figure 3 is a vertical sectional view taken on the line 3—3 of Figure 1.

Figure 4 is an enlarged detail view of the releasing pin in locked position.

Referring to the drawing in detail wherein like reference numerals refer to like parts throughout the several views, reference numeral 10 is used to designate the tow clamp, numeral 11 the rear bumper of the towing car, and numeral 12 the front bumper of the car being towed.

The clamp 10 comprises two flat metal bars 13 and 14 which may be joined together in any suitable manner such as welding or riveting. The upper metal bar has one end bent upwardly into a vertical section 15 terminating in a curved section 16. Semi-circular sections 17 are welded to the vertical section 15 at the curved end thereof and forms therewith a housing. The lower edge 18 of section 17 also serves as a bearing surface against the upper edge of the bumper 12. An opening 19 is provided in the uper metal bar adjacent its vertical section for a purpose that will appear.

The lower bar 14 terminates short of the upper bar 13 and has a hook member 20 pivoted thereto by a pintle 21. The hook member 20 comprises a horizontal portion 22, a downwardly extending portion 23, curved portion 24 and upwardly extending portion 25. The upper end of portion 25 may extend within the housing portion, or may stop short thereof, depending on the width of the bumper or whether or not the bumper has a top flange thereon. The hook member is not held closed by reason of its fitting within the housing portion but by means of a locking arrangement described below.

A chain member 26 is anchored to the vertical section by an eye member 27 and to the hook member 20 by an eye member 28. The chain is of sufficient length to permit hook member 20 to drop to its lowermost position. The chain member 26 extends through the opening 19 in the member 13.

Mounted on the upper surface of the bar member 13 is a bracket member 29 having a pair of vertical lugs 30 and 31. A horizontal rod 32 is mounted for sliding movement in openings formed in the two vertical lugs. A hooked portion 33 is formed at one end of the rod and is hooked around the leg 30 to lock the rod in the bracket 29. A spring 34 surrounds the rod between the leg 30 and the closed end of the hooked portion. This serves to normally urge the rod to the right as seen in Figure 1, where it is in its locked position. The free end of the rod 32 is adapted to project through one of the links of the chain as seen in detail in Figure 4. It will be obvious that the opening of the hooked member 20 can be adjusted to various positions depending on which link of the chain receives the sliding bar. A wire or pull member 35 has one end connected to the hooked portion of the rod 32 and its other end fastened within the towing car within reach of the driver of the car.

A swivelly mounted clamping member is provided at the opposite end of the tow clamp for securing the tow clamp to the towing car. This clamping member comprises an L-shaped bar having a horizontal portion 36 and a vertical leg 37. A lower member, including a horizontal portion 38 and a hooked portion 39, is swivelly connected to the bar members 13 and 14 and to the upper horizontal member 36 through a rivet 40 as seen in Figure 3. A hooked member 41 is pivotally mounted to portion 39 by a pintle 42. Member 44 is provided with an opening 43 adapted to receive a hasp member 44 mounted on vertical member 37. The hasp member has the usual opening and is adapted to receive a latching member 45 mounted on the hooked member 41.

In the use of the device with an ordinary passenger car or truck, the device may be carried in the tool compartment of the car or truck. When necessary to use the towing clamp, the clamping member may be mounted on the rear bumper of the towing car in an obvious manner. The other end of the tow clamp is secured to the front bumper of the car to be towed by placing the curved portion 16 over the bumper 12 and encircling the bumper with the pivoted hook 20. The chain is pulled up as far as it will go with the rod 32 retracted whereupon the rod is released with its free end extending through the corresponding link of the chain to hold the hooked portion in a closed locked position. The car is then in position to be towed. When it is desired to release the tower car, the driver of the towing car can pull on the wire 35, thereby retracting rod 32 which unlocks hinged portion 20, permitting it to drop and causing separation of the clamp from the towed car.

It will be appreciated that the tow clamp can be used as a permanent attachment of a towing truck. It will be further appreciated that any form of locking means can be substituted for the chain 26. For example, at point 28 of hook member 20, a single hook may be used to receive the free end of the sliding rod 32.

Thus it will be seen that the construction herein shown and described is well adapted to accomplish the objects of the present invention. It will be understood that, in the embodiment illustrated, minor changes in the construction may be made without departing from the spirit of the invention. Therefore, I do not wish to be limited precisely to the construction herein shown except as may be required by the appended claims considered with reference to the prior art.

Having thus described my invention, what is claimed is:

1. A tow line clamp comprising a rigid member having a swivelly mounted clamping member at one end and a pivoted hook member at the other end thereof, locking means secured to said hook member, a locking member slidably mounted on said rigid member for cooperating with said locking means to hold the hook member in an upright locked position, spring means on said locking member to urge the member outwardly into locking engagement, and a remotely controlled pull member connected to said locking member for retracting same against the action of the spring.

2. In a tow line clamp, a rigid frame member, a hook member pivotally mounted on said frame member, said hook member having a horizontal portion and a vertical portion, said vertical portion adapted to engage behind the bumper of a car, a locking member mounted on the upper surface of the horizontal portion, a reciprocable rod mounted on the upper surface of the rigid frame member for engagement with the locking member to hold the hook member in an upright position.

3. In a tow line clamp of the character described in claim 2, a wire member connected to said reciprocable rod for operating the same at a point removed from said clamp.

4. In a tow line clamp, a rigid frame member, a vertically extending portion at one end of the frame member, a hook member pivotally mounted on said frame member adjacent said vertically extending portion, said hook member having a horizontal portion and a vertical portion, a chain having one end connected to the upper surface of said horizontal portion and its other end connected to the vertically extending portion, and a reciprocable rod member mounted on the upper surface of the frame member, said rod member having one end thereof movable into a link of the chain.

5. In a tow line clamp, a rigid frame member, a vertically extending portion at one end of the frame member, a hook member pivotally mounted on said frame member adjacent said vertically extending portion, said hook member having a horizontal portion and a vertical portion, a chain having one end connected to the upper surface of said horizontal portion and its other end connected to the vertically extending portion, a reciprocable rod member mounted on said frame member, a spring mounted on the rod for urging one end of the rod member into engagement with one of the links on the chain, and a remotely operated pull member connected to the other end of the rod for retracting said rod out of engagement with the chain.

HEYMAN KATZ.

REFERENCES CITED

The following references are of record in the file of this patent:

UNITED STATES PATENTS

| Number | Name | Date |
|---|---|---|
| 2,210,007 | Rodin | Aug. 6, 1940 |
| 2,258,678 | Elwood | Oct. 14, 1941 |